United States Patent [19]

Smith et al.

[11] Patent Number: 5,340,902
[45] Date of Patent: Aug. 23, 1994

[54] SPANDEX FIBERS MADE USING LOW UNSATURATION POLYOLS

[75] Inventors: Curtis P. Smith, Cheshire; James M. O'Connor, Branford, both of Conn.

[73] Assignee: Olin Corporation, Cheshire, Conn.

[21] Appl. No.: 73,011

[22] Filed: Jun. 4, 1993

[51] Int. Cl.$^5$ ............................................. C08G 18/32
[52] U.S. Cl. ........................................ 528/61; 528/62; 528/63; 528/64; 528/76; 264/176.1; 264/178 R; 264/211.24
[58] Field of Search ............... 528/61, 62, 63, 64, 528/76, 77; 264/176.1, 178 R, 211.24

[56] References Cited

U.S. PATENT DOCUMENTS

| | | | |
|---|---|---|---|
| 2,929,804 | 3/1960 | Steuber | 260/77.5 |
| 3,642,964 | 2/1972 | Rausch et al. | 264/40 |
| 3,941,849 | 3/1976 | Herold | 260/607 A |
| 4,002,711 | 1/1977 | Peters | 264/184 |
| 4,242,490 | 12/1980 | Emerson et al. | 528/77 |
| 4,335,188 | 6/1982 | Igi et al. | 428/458 |
| 4,355,188 | 10/1982 | Herold et al. | 568/620 |
| 4,472,560 | 9/1984 | Kuyper et al. | 526/120 |
| 4,477,589 | 10/1984 | van der Hulst et al. | 582/169 |
| 4,985,491 | 1/1991 | Reisch | 524/875 |
| 5,096,993 | 3/1992 | Smith et al. | 528/61 |
| 5,100,997 | 3/1992 | Reisch et al. | 528/60 |
| 5,116,931 | 5/1992 | Reisch et al. | 528/59 |
| 5,136,010 | 8/1992 | Reisch et al. | 528/75 |
| 5,185,420 | 2/1993 | Smith et al. | 528/61 |

*Primary Examiner*—Maurice J. Welsh
*Attorney, Agent, or Firm*—Dale L. Carlson

[57] ABSTRACT

This invention relates to the production of spandex fibers made from segmented polyurethane(urea)s which are prepared from low unsaturation-containing polyols made by polymerizing alkylene oxides in the presence of a double metal cyanide complex catalyst. With the low unsaturation-containing polyols, spandex fibers can be prepared that have better physical properties than fibers prepared with PTMEG polyols.

21 Claims, No Drawings

SPANDEX FIBERS MADE USING LOW UNSATURATION POLYOLS

FIELD OF THE INVENTION

This invention relates to the utilization of elastomeric polyurethanes made using low ethylenic unsaturation-containing polyols that are essentially free of mono-ol in the production of spandex fibers. The spandex fibers made using these polyols exhibit excellent physical properties.

BACKGROUND OF THE INVENTION

A variety of elastomeric polymers are known in the art. By way of illustration, polyurethane elastomers made from polyols prepared using a double metal cyanide complex catalyst are known, as illustrated by U.S. Pat. No. 5,096,993 which discloses the production of thermoplastic ("TPU") elastomers made using DMC-prepared polyether polyols. These elastomers are disclosed in the '993 patent as having excellent physical and chemical properties.

One particular elastomeric polymer in fiber form, namely spandex, is a well-known component of clothing, particularly sportswear, which adds elasticity to the clothing. Spandex is, by definition, a hard-segment-/soft-segment-containing, urethane-containing polymer composed of at least 85% by weight of a segmented polyurethane(urea). The term "segmented" refers to alternating soft and hard regions within the polymer structure. Formation of the segmented polymer structure takes place in several discrete steps. The first step involves the formation of linear polyester or polyether macroglycols typically having molecular weights of between about 500 and about 4000 and having isocyanate reactive hydroxyl group at both ends of the macroglycol molecule. The next step involves the reaction of the macroglycol with an excess of an isocyanate, typically in about a 1:2 molar ratio, to form an isocyanate-terminated soft segment prepolymer. The hard segments are formed next by reacting the isocyanate-terminated prepolymer with low molecular weight glycols or diamines. The resulting hard segments provide sites for hydrogen bonding and act as tie points in the segmented polyurethane responsible for long-range elasticity. As an alternative to the prepolymer method, a "one-shot" method is suitably used to produce the desired elastomeric polymer for subsequent processing to produce spandex fibers by melt spinning.

Spandex fibers are suitably prepared by extruding the urethane or urethane precursor through a spinnerette into a diamine bath where filament and polymer formation occur simultaneously, as disclosed, for example, in U.S. Pat. No. 4,002,711.

The current polyol of choice in the manufacture of spandex is poly(tetramethylene ether glycol) ("PTMEG") and the utilization of PTMEG in the preparation of spandex is disclosed, for example, in U.S. Pat. No. 5,185,420. Unfortunately, PTMEG is more expensive than might be desired, and the physical properties of the resulting spandex leave room for improvement, particularly with respect to strength and thermal and hydrolytic stability properties.

The present invention provides a method to achieve these excellent strength and stability properties at a cheaper cost than is associated with the use of PTMEG polyols.

SUMMARY OF THE INVENTION

In one aspect, the present invention relates to a process for enhancing the strength and hydrolytic or thermal stability of spandex fibers from a polyurethane or polyurethane precursor which comprises, prior to fiber formation, fabricating the polyurethane or polyurethane precursor by reacting a polyisocyanate (preferably a diisocyanate) with a polyol (preferably a diol) prepared using a double metal cyanide complex catalyst, and chain extending said polyurethane precursor with a diol or diamine chain extender, said polyol having a molecular weight in the range of between about 1,500 and about 15,000 (preferably between 2000 and 10,000) and a low level of terminal ethylenic unsaturation that is generally less than 0.03, preferably less than 0.02, more preferably less than 0.015, milliequivalents per gram of polyol.

In another aspect, the present invention relates to a method of using a polyol which comprises incorporating the polyol into a spandex fiber-forming composition prior to spinning the composition to fabricate the spandex fiber, wherein said polyol is prepared using a double metal cyanide complex catalyst and having a molecular weight in the range of between about 1,500 and about 15,000 (preferably between 2000 and 10,000) and a low level of terminal ethylenic unsaturation that is generally less than 0.03, preferably less than 0.02, more preferably less than 0.015, milliequivalents per gram of polyol.

In yet another aspect, the present invention relates to a spandex fiber, characterized by improved strength and hydrolytic or thermal stability relative to PTMEG-based spandex fiber, made by the steps of:

(a) forming a polyurethane or polyurethane prepolymer by reacting a polyisocyanate (preferably a diisocyanate) with a polyol (preferably a diol) prepared using a double metal cyanide complex catalyst and having a molecular weight in the range of between about 1,500 and about 15,000 (preferably between 2000 and 10,000) and having a level of terminal ethylenic unsaturation that is generally less than 0.03, preferably less than 0.02, more preferably less than 0.015, milliequivalents per gram of polyol, and spandex fibers by the melt spinning, reaction spinning, wet spinning, and dry spinning processes to provide said polyurethane or polyurethane prepolymer, with the proviso that any polyurethane prepolymer thus formed is chain-extended with a diamine to form a chain-extended polyurethane, and (b) extruding said polyurethane or said chain-extended polyurethane by a process selected from the group consisting of melt extrusion, reaction spinning, solution dry spinning, and solution wet spinning, in order to provide said spandex fiber.

In still another aspect, the present invention relates to a method of fabricating a spandex fiber which comprises the steps of:

(a) producing a polyol utilizing a double metal cyanide catalyst, said polyol being characterized by having a molecular weight in the range of between about 1,500 and about 15,000 and a low level of terminal ethylenic unsaturation that is less than 0.03 milliequivalents per gram of polyol, (b) reacting said polyol with a diisocyanate to produce a polyurethane prepolymer, (c) chain extending said polyurethane prepolymer with a difunctional isocyanato-reactive chain extender to produce a chain-extended polyurethane, and (d) extruding said polyurethane or said chain-extended polyurethane by a process selected from the group consisting of melt extrusion, reaction spinning, solution dry spinning, and solution wet spinning, in order to provide said spandex fiber.

In yet another aspect, the present invention relates to a "one-shot" process for producing a spandex fiber which comprises reacting a polyol, a diisocyanate, and a difunctional, isocyanato-reactive chain-extender, the polyol being prepared utilizing a double metal cyanide complex catalyst and having a molecular weight in the range of between about 1,500 and about 15,000 and a low level of terminal ethylenic unsaturation that is less than 0.03 milliequivalents per gram of polyol.

These and other aspects will become apparent upon reading the following detailed description of the invention.

DETAILED DESCRIPTION OF THE INVENTION

It has now been surprisingly found that the formation of highly stretchable spandex fibers based on segmented polyurethane(urea)s with comparable or improved elastic, thermal, and hydrolytic properties prepared from relatively high molecular weight polyether diols in the molecular weight range of between about 1,500 and about 15,D00 (preferably between 2000 and 10,000) that have low levels of terminal ethylenic unsaturation that is generally less than 0.03, preferably less than 0.02, more preferably less than 0.015, milliequivalents per gram of polyol.

The polyols having low ethylenic unsaturation which are useful in the present invention are suitably prepared based on the polymerization of alkylene oxides using double metal cyanide catalysts, as more fully described in U.S. Pat. No. 4,985,491. The low unsaturation polyols prepared by this methodology are essentially free of monol. By "essentially free of monol" is meant that the low unsaturation polyol contains less than 5%, preferably less than 2%, by weight of monol, based upon the weight of the polyol produced. The preparation of thermoplastic polyurethane elastomers and polyurea elastomers made using low unsaturation level polyols prepared with double metal cyanide catalysts is described in U.S. Pat. Nos. 5,096,993 and 5,185,420 while the preparation of elastomers using high molecular weight polyols or polyamines, said polyols prepared using a double metal cyanide complex catalyst is described in U.S. Pat. No. 5,110,997. The preparation of polyurethane elastomers made using low unsaturation level polyols prepared with double metal cyanide catalysts via the prepolymer route is described in U.S. Pat. Nos. 5,136,010 and 5,116,931.

Spandex fibers made from polyurethanes or polyurethane precursors that are based on low unsaturation-containing polyols, in accordance with the present invention, exhibit comparable or increased strength properties as well as comparable or increased thermal and hydrolytic stability, relative to PTMEG-based spandex, based upon a comparison of similar-hardness materials. By way of illustration of a comparison of similar-hardness materials, to make an 80 Shore A PPG-based elastomer having physical properties comparable to, or better than, one based on a 1,000 molecular weight PTMEG, a molecular weight in the range of between 1,500 and 2,200 is required for the PPG-based elastomer.

Without wishing to be bound by any particular theory, the improved physical properties associated with the spandex produced in accordance with the present invention is attributable, at least in part, to the low unsaturation of the DMC polyols used. In contrast to DMC catalysis, conventional polyether polyols prepared from the polymerization of epoxides (most commonly propylene oxide or ethylene oxide) are typically prepared with an alkaline base catalyst such as potassium hydroxide. Polyhydric initiators having a selected functionality are then oxyalkylated to prepare polyether polyols with a desired functionality. For example, difunctional alcohols such as propylene glycol, dipropylene glycol, or tripropylene glycol are commonly used as precursors to prepare difunctional polyether polyols (diols).

During the base-catalyzed polymerization of propylene oxide, a competitive reaction occurs between the desired attack at the oxirane ring, to form polyol by ring-opening polymerization, and a side reaction in which the base attacks at the methyl group, to form allyl alcohol. The allyl alcohol then acts as a monofunctional initiator, and propoxylates to form monol.

The amount of monol in a polyol is measured by titration of the unsaturated end groups and reported as milliequivalents of unsaturation per gram of polyol. Since the molecular weight of the monol is less than one half the molecular weight of the diol, a small amount of terminal unsaturation translates into a high mole percentage of monol. For example, a 4000 molecular weight poly(propylene oxide) diol capped with 20% ethylene oxide having an unsaturation value of 0.080 meq/g means the polyol contains 27.5 mole monol or 16 weight % monol.

As stated above, the polyols employed in the present invention are essentially free of monol. The monol species with unsaturated end groups act as chain terminators in elastomer formation, limiting the molecular weight of the elastomer and downgrading the physical properties of the polyurethane. The presence of terminally unsaturated end groups substantially lowers the hydroxyl functionality. For example, the 4000 molecular weight diol with 0.080 meq/g of unsaturation has a calculated functionality of only 1.72 whereas a pure diol has a functionality of 2.0.

In polyols prepared with base catalyst, the amount of unsaturation formed increases as a direct function of equivalent weight and eventually conditions are established in which the amount of unsaturation being formed balances the additional molecular weight of the growing chain. Using KOH catalysis the rate of unsaturation formation can be lowered by using lower temperatures and longer reaction times but now the process becomes prohibitively expensive. In actual practice, 2200 is about the highest equivalent weight obtained with KOH catalysis (4400 MW diol, 6600 MW triol).

In contrast, using double metal cyanide (DMC) catalysts in accordance with the present invention, the amount of unsaturation formed increases very slowly with increasing polyol equivalent weight, which allows the synthesis of ultra high molecular weight polyols containing low levels of monol.

Since spandex fibers are made from a polymer, specifically a polymer that contains at least 85% by weight of a segmented polyurethane, and polymer properties are governed by molecular weight, any component that will increase the molecular weight of the polymer will improve the physical properties of the polymer or materials made from the polymer.

Thermoplastic polyurethane elastomers in the hardness range of Shore A 10 to Shore D 65, advantageously between about Shore A 50 and Shore D 45 with excellent thermal properties, are produced utilizing polyols made with double metal cyanide complex catalysts. The elastomers are more physically stable against thermal degradation than are prior art polyols, such as so-called PTMEG, and they exhibit excellent physical and chemical properties. The elastomers possess the hydrolytic stability commonly exhibited by polyether-based polyurethanes as well as excellent structural strength and stability characteristics. In addition, the elastomers are recyclable and can be remolded.

The thermoplastic elastomers of the present invention may be made by the prepolymer process or the one-shot process. The polyurethane isocyanate-terminated prepolymer that is utilized when employing the prepolymer process according to the invention is prepared by reacting an organic polyisocyanate with a polyalkylene ether polyol(s) in an equivalent ratio of NCO to OH groups of from about 15:1 and about 1.2:1 (preferably between 7:1 and 3:1), using standard procedures, to yield an isocyanate-terminated prepolymer of controlled molecular weight. The reaction may be accelerated by employing a catalyst. Common urethane catalysts are well known in the art and include numerous organometallic compounds as well as amines, e.g., tertiary amines and metal compounds such as lead octoates, mercuric succinates, stannous octoate or dibutyltin dilaurate may be used. Any catalytic amount may be employed; illustratively, such amount varies, depending on the particular catalyst utilized, from about 0.01 to about 2 percent by weight of the polyurethane prepolymer.

Preferred polyol reactants are the polyether diols and combinations thereof. Suitable polyether diols include various polyoxyalkylene diols and combinations thereof preferably containing ethylene oxide ("EO") in an amount of between about 5 and about 40, more preferably between about 15 and about 30, weight percent based upon the weight of the polyol. Suitable diols preferably have a primary hydroxyl content of between about 30 and about 95%, more preferably between about 50 and about 95%. The ethylenic unsaturation level for the polyol is generally less than 0.03, preferably less than 0.02, more preferably less than 0.015, milliequivalents per gram of polyol. It is preferred that any residual alkali metal catalyst in the polyol be no greater than 25 ppm, more preferably no greater than 8 ppm, most preferably no greater than 5 ppm. The potential adverse effects of residual alkali metal catalyst in the polyol can be overcome by neutralizing with an effective amount of an acid, such as phosphoric acid.

The polyols can be prepared, according to well-known methods, by condensing an alkylene oxide, or a mixture of alkylene oxides using random or step-wise addition, with polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether diol reactant includes the following and mixtures thereof: ethylene glycol, diethylene glycol, propylene glycol, dipropylene glycol, butylene glycol, butane diols, pentane diols, water, combinations thereof, and the like.

The alkylene oxide-polyhydric initiator condensation reaction is preferably carried out in the presence of a double metal cyanide catalyst. Without wishing to be bound by any particular theory, it is speculated by the present inventor that unsaturated end groups result in monofunctional species that act as chain stoppers in elastomer formation. In polyol synthesis with KOH catalysis, the unsaturation formed increases as a direct function of equivalent weight. Eventually conditions are established wherein further propylene oxide addition fails to increase the molecular weight. In other words, the use of alkali catalysts to produce high molecular weight, hydroxy terminated polyoxypropylene ethers results in a substantial loss in hydroxy functionality. With double metal cyanide catalysis, much less unsaturation is formed allowing higher equivalent weight polyols to be prepared.

The double metal cyanide complex class catalysts suitable for use and their preparation are described in Shell Chemical Company U.S. Pat. Nos. 4,472,560 and 4,477,589 and The General Tire & Rubber Company U.S. Pat. Nos. 3,941,849; 4,242,490 and 4,335,188. The teachings of the foregoing patents are incorporated herein by reference.

One double metal cyanide complex catalyst found particularly suitable for use is zinc hexacyanometallate of formula:

$$Zn_3[M(CN)_6]_2 \cdot xZnCl_2 \cdot yGLYME \cdot zH_2O$$

wherein M may be Co(III), or Cr(III) or Fe(II) Fe(III); x, y, and z may be fractional numbers, integers, or zero and vary depending on the exact method of preparation of the complex.

Any suitable organic diisocyanate, or mixture of diisocyanates, may be used in the elastomer-forming process of the present invention. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate (also referred to as diphenylmethane diisocyanate or MDI), dibenzyl diisocyanate, xylene diisocyanate (XDI), isophorone diisocyanate (IPDI), 3,3'-bistoluene-4,4'-diisocyanate, hexamethylene diisocyanate (HDI), hydrogenated MDI, hydrogenated XDI, cyclohexane diisocyanate, paraphenylene diisocyanate, mixtures and derivatives thereof, and the like. Other advantageous embodiments of the invention suitably employ an isomeric mixture of 2,4 - and 2,6-toluene diisocyanate in which the weight ratio of the 2,4-isomer to the 2,6-isomer is from about 60:40 to about 90:10, and more preferably from about 65: 35 to about 80:20, as well as MDI.

Chain extenders useful in the present invention include diols and diamines, including aliphatic, heterocyclic, and inorganic diamines, such as, for example, ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, or polyalkylene oxide diols with molecular weights between 100–500, diethyltoluene diamine, ethylene diamine, 4,4'-methylene bis(2-chloroaniline) ("MOCA"), hydrazine, substituted aromatic diamines such as the product commercially available as UNI-LINK 4200, a product of UOP, Inc. N,N-bis(2-hydroxypropyl)-aniline which is commercially available as ISONOL 100, product of Dow Chemical Corp., and the like, and combinations thereof. The chain extension can be conducted either in situ during the prepolymer formation or in a separate reaction step. Various primary and secondary amines can be used to form the polymers or semi-polymers. Preferred diamines include hydrazine, ethylene diamine, piperazine, 1,4-diamine-2-methyl piperazine, 1,4-diamine-2,5-dimethyl piperazine and methylimino bispropylamine.

In preparing the polyurethane and/or polyurea elastomer, the polyether polyol(s), polyisocyanate(s), chain extender(s), and other components are reacted, typically under conditions of an elevated temperature. A preferred method of forming the desired thermoplastic elastomers is by continuous processing utilizing an extruder as illustrated by U.S. Pat. No. 3,642,964, incorporated herein by reference in its entirety. An alternative method involves batch processing, followed by grinding and extrusion of the formed elastomer as is well-known in the art. Although either the prepolymer method or the one-shot method can be used, the one-shot method is preferred. The one-shot method is intended to also include the process whereby the diisocyanate has been converted to quasi-prepolymer by reaction with a minor amount (i.e., less than about 10 percent on an equivalent basis) of polyol prior to carrying out the polyurethane forming reaction.

In preparing the elastomer, urethane forming catalysts can be used as well as the usual compounding ingredients such as antioxidants or other antidegradants. Typical antioxidants include hindered phenols, butylated hydroxytoluene ("BHT"), and the like. Other optional compounding ingredients include, for example, plasticizers, adhesion promoters, fillers and pigments like clay, silica, fumed silica, carbon black, talc, phthalocyanine blue or green, $TiO_2$, U-V absorbers, $MgCO_3$, $CaCO_3$ and the like. The compounding ingredients, such as fillers, are suitably employed in the elastomer in an amount of between 0 and about 75 weight percent based upon the weight of the elastomer. The polymerization reaction may be carried out in a single reaction (one-shot process), or in one or more sequential steps (prepolymer process), using either bulk polymerization or solution polymerization. When solution polymerization is used, polar solvents such as tetrahydrofuran ("THF"), dimethylformamide ("DMF"), and dimethylacetamide ("DMAC") are typically utilized.

In the one-shot process, all the isocyanate-reactive components are reacted simultaneously with the polyisocyanate. In such process, it is normal practice to blend all components except the polyisocyanate into a "B-side" mixture, which is then reacted with the polyisocyanate to form the polyurethane and/or polyurea elastomer. However, the order of mixing is not critical so long as the components do not undesirably react before all components are present. The reaction mixture is usually then placed in a mold, or extruded through an extruder, and cured at a suitable temperature. The apparatus used for blending and molding is not especially critical. Hand mixing, conventional machine mixing, and the so-called reaction injection molding (RIM) equipment are all suitable.

In the prepolymer process, all or a portion of one or more of the isocyanate reactive materials is reacted with a stoichiometric excess of the polyisocyanate to form an isocyanate-terminated prepolymer. This prepolymer is then allowed to react with the remaining isocyanate-reactive materials to prepare the polyurethane and/or polyurea elastomer. The prepolymer can be prepared with either the polyether or the chain extender, or a mixture of both.

The mixing of the reactants can be carried out at ambient temperature (of the order of 25° C.) and the resulting mixture is then heated to a temperature of the order of about 40° C. to about 130° C., preferably to a temperature of about 90° C. to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air, water, or other gases before the reaction takes place. This degassing is accomplished conveniently by reducing the pressure under which the components are maintained until no further evolution of bubbles occurs. The degassed reaction components are then admixed and transferred to suitable molds or extrusion equipment or the like and cured at temperature of the order of about 20° C. to about 115° C. The time required for curing will vary the temperature of curing and also with the nature of the particular composition, as is known in the art.

Mechanical properties of spandex produced in accordance with the present invention may be suitably modified by changing the molecular weight of the polyester or polyether macroglycol, the type of polyester or polyether glycol, the diisocyanate, or the diamine or diol chain extender. The properties may also be modified by changing the glycol-diisocyanate molar ratio used.

Spandex is typically produced using one of four different processes: melt extrusion, reaction spinning, solution dry spinning, and solution wet spinning. All processes involve differing practical applications of basically similar chemistry. In general, a block copolymer is prepared by reacting a diisocyanate with a polyester macroglycol, a polyether macroglycol, or a mixture of the two in a molar ratio of about 1:2 and then chain extending the prepolymer with a low molecular weight diol or diamine near stoichiometry. If the chain extension is carried out in a solvent, the resulting solution may be wet- or dry-spun into fiber. The prepolymer may be reaction-spun by extrusion into an aqueous or non-aqueous diamine bath to begin polymerization to form a fiber or the prepolymer may be chain extended with a diol in bulk and the resulting block copolymer melt-extruded in fiber form.

Melt spinning is conducted in a manner similar to the melt extrusion of polyolefins. Although considerable development work has been done in formulating melt-extrudable urethane polymers this process is not used to any great extent. This process is Reaction spinning is typically carried out after reacting a glycol (advantageously having a 1000–3000 molecular weight) with a diisocyanate to form a prepolymer. The prepolymer is then extruded into a diamine bath where filament and polymer formation occur simultaneously, as described in more detail in the working examples hereinbelow and in U.S. Pat. No. 4,002,711.

When employing solution spinning, either melt or reaction solution spinning, the first step involves the formation of a prepolymer. Highly elastic polyurethanes are obtained on direct reaction of macrodiisocyanates with diamines in highly polar solvents such as dimethylformamide or dimethyl sulfoxide, as described in more detail in U.S. Pat. No. 2,929,804. In dry solution spinning, the polymer solution is processed forming a filament and evaporating the solvent. About 80% of all spandex is produced by various adaptations of this method. In wet spinning the filament is formed by spinning in a solvent-water coagulation bath. In general any urethane that may be solution dry-spun may also be wet-spun. In contrast, many wet-spinnable formulations may not be successfully dry-spun.

Spinning is suitably accomplished by extruding a solvent solution or a melt of a spandex polymer through a spinnerette having a plurality of orifices to form a plurality of filaments.

For solution spinning, it is customary to prepare a so-called polymer solution by reacting a prepolymer with a diamine in essentially stoichiometric proportions in admixture with a solvent to produce a high molecular weight polymer solution suitable for formation into films, extrusion into a water bath to form filaments and so forth. These solutions generally contain between about 15 and about 25% by weight polymer based upon the weight of the solution.

The amount of diamine that can be used to form the polymer or semi-polymer solution can be varied such that the amount necessary to complete the reaction is found in the water bath. The gradual addition of diamine to the prepolymer solution results in the gradual increase in the viscosity of the solution. It is advisable to add sufficient diamine to increase the viscosity of the solution to at least 50 poises to obtain a solution which can be easily extruded. Generally it is more advantageous to extrude solutions having viscosities between about 100 to 500 poises.

The amount of diamine which can be used in the bath to complete the reaction of the semi-polymers can vary considerably as will be apparent to those skilled in the art. It is generally advantageous to insert into the bath considerably more diamine than will be required to react with all of the semi-polymer.

Various solvents can be used to form the polymer or semi-polymer solutions as will be apparent to those skilled in the art such as dimethyl formamide, dimethyl sulfoxide, dimethyl acetamide, etc.

In the formation of filaments the extrusion speed obtainable will depend mainly upon the reactivity of the diamine employed in the bath with the isocyanate semi-polymer, the diffusion rate of the diamine, the bath temperature, etc. The extrusion or spinning speed also depends on the length of the bath.

Numerous additives may be employed for various purposes in the spinning solutions. For example, antioxidants, light protective agents, dyes to improve the aesthetic effect, pigments, coloring additives, antistatic agents and additives which act as anti-stick agents, such as magnesium, calcium, lithium, zinc and/or aluminum stearates, etc.

The examples describing the formation of spandex fibers are not limiting. The low unsaturation-containing polyols used in this invention allow one to make spandex fibers by the melt spinning, reaction spinning, wet spinning, and dry spinning processes.

As used herein, the term "molecular weight" is intended to designate number average molecular weight.

While the invention has been described above with reference to specific embodiments thereof, it is apparent that many changes, modifications and variations can he made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

PROPOSED EXAMPLES

Proposed Example 1

A. Prepolymer Preparation PPG 2,000 and MDI 1200 parts of a difunctional polypropylene oxide glycol (herein also referred to as "PPG") having a molecular weight of 2000 and unsaturation of 0.015 meq/g is heated to 60° C. in an inert nitrogen atmosphere and then mixed with 303 parts of methylene bis(4-phenylisocyanate). The mixture is heated to 100° C. in an inert nitrogen atmosphere and under anhydrous conditions and held at this temperature for 90 minutes. The resulting prepolymer is then cooled to 50° C. and diluted with 1500 parts of dimethyl formamide to yield a 50% solution of the isocyanate terminated prepolymer. The prepolymer solution is now divided into two equal parts. Optionally, urethane catalysts such as stannous octoate or dibutyl tin dilaurate may be used to hasten the prepolymer reaction.

B. Spandex Fiber Preparation—Hydrazine Chain Extension and Hydrazine Bath

A 10% by weight solution of anhydrous hydrazine and dimethyl formamide is slowly added to one-half of the prepolymer solution of Example 1(A) with vigorous stirring until viscosity of 200–250 poises is obtained. The resulting solution is degassed under vacuum and extruded through a spinnerette containing 10 holes each 0.004 inch in diameter into a water-bath containing 10% by weight hydrazine. The filaments formed in the bath are then rinsed in a water bath and dried at 125° C. for 5 minutes. The resulting elastic filaments have excellent elongation and modulus value at 300%.

Proposed Example 2—Hydrazine Chain Extension and Ethylene Diamine Bath

Another portion of the same semi-polymer solution of Example 1(B) is extruded in the same manner into a water-bath containing 20% by weight ethylene diamine. The formed filaments are then also rinsed in water and similarly dried. The resulting filaments have excellent elongation and modulus value at 300% extension.

Proposed Example 3—Ethylene Diamine Chain Extension and Hydrazine Bath

A 10% by weight solution of anhydrous ethylene diamine and dimethyl formamide is added to the other half of the prepolymer solution of Example 1(A) in the same manner until viscosity of 210–260 poises is obtained. The viscous semi-polymer solution is then degassed and extruded in the same manner into a water-bath containing 10% by weight hydrazine. The formed filaments are similarly rinsed in water and dried at 125° C. for 5 minutes. The resulting elastic filaments have an excellent elongation and modulus value at 300% extension.

Proposed Example 4—Ethylene Diamine Chain Extension and Ethylene Diamine Bath

Another portion of the ethylene diamine same semi-polymer solution of Example 3 is extruded in the same manner into a water-bath containing 20% by weight ethylene diamine. The formed filaments are similarly rinsed and have an excellent elongation and modulus value at 300% extension.

Proposed Example 5—Prepolymer Based on PPG 2,000 and TDI 1200 parts of a difunctional polypropylene oxide glycol having a molecular weight of 2000 and unsaturation of 0.015 meq/g is heated to 60° C. in an inert nitrogen atmosphere and then mixed with 211 parts of tolylene 2,4-diisocyanate. The mixture is heated to 75°–85° C. in an inert nitrogen atmosphere and under anhydrous conditions and held at this temperature for 90–180 minutes. The resulting prepolymer is then cooled to 50° C. and diluted with 1500 parts of dimethyl formamide to yield a 50% solution of the isocyanate terminated prepolymer. The prepolymer solution is now divided into two equal parts.

Proposed Example 6—Hydrazine Chain Extension and Hydrazine Bath

A 10% by weight solution of anhydrous hydrazine and dimethyl formamide is slowly added to one-half of the prepolymer solution of Example 5 with vigorous stirring until viscosity of 200–250 poises is obtained. The resulting solution is degassed under vacuum and extruded through a spinnerette containing 10 holes each 0.004 inch in diameter into a water-bath containing by weight hydrazine. The filaments formed in the bath are then rinsed in a water bath and dried at 125° C. for 5 minutes. The resulting elastic filaments have excellent and modulus value at 300% elongation.

Proposed Example 7—Hydrazine Chain Extension and Diamine Bath

Another portion of the same semi-polymer solution of Example 6 is extruded in the same manner into a water-bath containing 20% by weight ethylene diamine. The formed filaments are then also rinsed in water and similarly dried. The resulting filaments have excellent elongation and modulus value at 300% extension.

Proposed Example 8—Ethylene Diamine Chain Extension and Hydrazine Bath

A 10% by weight solution of anhydrous ethylene diamine and dimethyl formamide is added to the other half of the prepolymer solution of Example 5 in the same manner until viscosity of 210–260 poises is obtained. The viscous semi-polymer solution is then degassed and extruded in the same manner into a water-bath containing 10% by weight hydrazine. The formed filaments are similarly rinsed in water and dried at 125° C. for 5 minutes. The resulting elastic filaments have an excellent elongation of and modulus value at 300% extension.

Proposed Example 9—Ethylene Diamine Chain Extension and Ethylene Diamine Bath

Another portion of the ethylene diamine same semi-polymer solution of Example 8 is extruded in the same manner into a water-bath containing 20% by weight ethylene diamine. The formed filaments are similarly rinsed and have an excellent elongation and modulus value at 300% extension.

Proposed Example 10—Prepolymer based on PPG 2000 and $H_{12}MDI$ 1200 parts of a difunctional polypropylene oxide glycol having a molecular weight of 2000 and unsaturation of 0.015 meq/g is heated to 60° C. in an inert nitrogen atmosphere and then mixed with 318 parts of methylene bis(4-cyclohexylisocyanate). The mixture is heated to 100° C. in an inert nitrogen atmosphere and under anhydrous conditions and held at this temperature for 90–360 minutes. The resulting prepolymer is then cooled to 50° C. and diluted with 1500 parts of dimethyl formamide to yield a 50% solution of the isocyanate terminated prepolymer. The prepolymer solution is now divided into two equal parts. Optionally, urethane catalysts such as stannous octoate or dibutyl tin dilaurate may be used to hasten the prepolymer reaction.

Proposed Example 11—Hydrazine Chain Extension and Hydrazine Bath

A 10% by weight solution of anhydrous hydrazine and dimethyl formamide is slowly added to one-half of the prepolymer solution of Example 10 with vigorous stirring until viscosity of 200–250 poises is obtained. The resulting solution is degassed under vacuum and extruded through a spinnerette containing 10 holes each 0.004 inch in diameter into a water-bath containing 10% by weight hydrazine. The filaments formed in the bath are then rinsed in a water bath and dried at 1250° C. for 5 minutes. The resulting elastic filaments have excellent and modulus value at 300%.

Proposed Example 12—Hydrazine Chain Extension and Ethylene Diamine Bath

Another portion of the same semi-polymer solution of Example 11 is extruded in the same manner into a water-bath containing 20% by weight ethylene diamine. The formed filaments are then also rinsed in water and similarly dried. The resulting filaments have excellent elongation and modulus value at 300% extension.

Proposed Example 13—Ethylene Diamine Chain Extension and Hydrazine Bath

A 10% by weight solution of anhydrous ethylene diamine and dimethyl formamide is added to the other half of the prepolymer solution of Example 10 in the same manner until viscosity of 210–260 poises is obtained. The viscous semi-polymer solution is then degassed and extruded in the same manner into a water-bath containing 10% by weight hydrazine. The formed filaments are similarly rinsed in water and dried at 125° C. for 5 minutes. The resulting elastic filaments have an excellent elongation and modulus value at 300% extension.

Proposed Example 14—Ethylene Diamine Chain Extension and Ethylene Diamine Bath

Another portion of the ethylene diamine same semi-polymer solution of Example 13 is extruded in the same manner into a water-bath containing 20% by weight ethylene diamine. The formed filaments are similarly rinsed and have an excellent elongation and modulus value at 300% extension.

Proposed Example 15—Prepolymer Based on PPG 4000 and MDI 1200 parts of a difunctional polypropylene oxide glycol having a molecular weight of 4000 and unsaturation of 0.015 meq/g is heated to 60° C. in an inert nitrogen atmosphere and then mixed with 151.5 parts of methylene bis(4-phenylisocyanate). The mixture is heated to 100° C. in an inert nitrogen atmosphere and under anhydrous conditions and held at this temperature for 90 minutes. The resulting prepolymer is then cooled to 50° C. and diluted with 1500 parts of dimethyl formamide to yield about a 50% solution of the isocyanate terminated prepolymer. The prepolymer solution is now divided into two equal parts and treated as in examples 2-5 above. Optionally, urethane catalysts such as stannous octoate or dibutyl tin dilaurate may be used to hasten the prepolymer reaction.

Proposed Example 16—Prepolymer Based on PPG 4000 Capped with EO and MDI 1200 parts of a difunctional polypropylene oxide glycol capped with 24% ethylene oxide having a molecular weight of 4000 and unsaturation of 0.015 meq/g is heated to 60° C. in an inert nitrogen atmosphere and then mixed with 151.5 parts of methylene bis(4-phenylisocyanate). The mixture is heated to 100° C. in an inert nitrogen atmosphere and under anhydrous conditions and held at this temperature for 90 minutes. The resulting prepolymer is then cooled to 50° C. and diluted with 1500 parts of dimethyl formamide to yield about a 50% solution of the isocyanate terminated prepolymer. The prepolymer solution is now divided into two equal parts and treated as in examples 2-5 above. Optionally, urethane catalysts such as stannous octoate or dibutyl tin dilaurate may be used to hasten the prepolymer reaction.

Proposed Example 17—Prepolymer Based on PPG 2000 Capped with EO and MDI 1200 parts of a difunctional polypropylene oxide glycol capped with 24% ethylene oxide having a molecular weight of 2000 and unsaturation of 0.015 meq/g is heated to 60° C. in an inert nitrogen atmosphere and then mixed with 151.5 parts of methylene bis(4-phenylisocyanate). The mixture is heated to 100° C. in an inert nitrogen atmosphere and under anhydrous conditions and held at this temperature for 90 minutes. The resulting prepolymer is then cooled to 50° C. and diluted with 1500 parts of dimethyl formamide to yield about a 50% solution of the isocyanate terminated prepolymer. The prepolymer solution is now divided into two equal parts and treated as in examples 2-5 above. Optionally, urethane catalysts such as stannous octoate or dibutyl tin dilaurate may be used to hasten the prepolymer reaction.

What is claimed is:

1. A process for enhancing the strength and hydrolytic or thermal stability of spandex fibers from a polyurethane or polyurethane precursor which comprises, prior to fiber formation, fabricating the polyurethane or polyurethane precursor by reacting a polyisocyanate with a polyol prepared using a double metal cyanide complex catalyst, and chain extending said polyurethane precursor with a diol or diamine chain extender, said polyol having a molecular weight in the range of between about 1,500 and about 15,000 and a low level of terminal ethylenic unsaturation that is less than 0.03 milliequivalents per gram of polyol.

2. The process of claim 1 wherein said molecular weight is between 2,000 and 10,000.

3. The process of claim 1 wherein said terminal ethylenic unsaturation is less than 0.02 milliequivalents per gram of polyol.

4. The process of claim 1 wherein said terminal ethylenic unsaturation is less than 0.015 milliequivalents per gram of polyol.

5. A spandex fiber, characterized by improved strength and hydrolytic or thermal stability relative to PTMEG-based spandex fiber, made by the steps of:
   (a) forming a polyurethane or polyurethane prepolymer by reacting a polyisocyanate with a polyol prepared using a double metal cyanide complex catalyst and having a molecular weight in the range of between about 1,500 and about 15,000 and a low level of terminal ethylenic unsaturation that is less than 0.03 milliequivalents per gram of polyol, with the proviso that any polyurethane prepolymer thus formed is chain-extended with a chain extender to form a chain-extended polyurethane, and
   (b) extruding said polyurethane or said chain-extended polyurethane by a process selected from the group consisting of melt extrusion, reaction spinning, solution dry spinning, and solution wet spinning, in order to provide said spandex fiber.

6. The fiber of claim 5 wherein said terminal ethylenic unsaturation is less than 0.02 milliequivalents per gram of polyol.

7. The fiber of claim 6 wherein said terminal ethylenic unsaturation is less than 0.015 milliequivalents per gram of polyol.

8. The fiber of claim 5 wherein said chain extender is selected from the group consisting of diols, diamines, hydrazine, and combinations thereof.

9. The fiber of claim 5 wherein said chain extender is selected from the group consisting of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, ethylene diamine, piperazine, 1,4-diamine-2-methyl piperazine, 1,4-diamine-2,5-dimethyl piperazine and methylimino bispropylamine and combinations thereof.

10. The fiber of claim 5 which additionally contains at least one compounding ingredient selected from the group consisting of anti-oxidants, plasticizers, uv stabilizers, adhesion promoters, fillers and pigments and employed in an amount of between 0 and about 75 weight percent based upon the total weight of the composition.

11. The fiber of claim 5 wherein said first polyol has a molecular weight of between 2,000 and 10,000.

12. A method of fabricating a spandex fiber which comprises the steps of:
   (a) producing a polyol utilizing a double metal cyanide catalyst, said polyol being characterized by having a molecular weight in the range of between about 1,500 and about 15,000 and a low level of terminal ethylenic unsaturation that is less than 0.03 milliequivalents per gram of polyol, (b) reacting said polyol with a diisocyanate to produce a polyurethane prepolymer, (c) chain extending said polyurethane prepolymer with a difunctional isocyanato-reactive chain extender to produce a chain-extended polyurethane, and (d) extruding said polyurethane or said chain-extended polyurethane by a process selected from the group consisting of melt extrusion, reaction spinning, solution dry spinning, and solution wet spinning, in order to provide said spandex fiber.

13. The method of claim 12 wherein said chain extender is selected from the group consisting of diols, diamines, hydrazine, and combinations thereof.

14. The method of claim 12 wherein said chain extender is selected from the group consisting of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof.

15. The method of claim 12 which additionally contains at least one compounding ingredient selected from the group consisting of anti-oxidants, plasticizers, uv stabilizers, adhesion promoters, fillers and pigments and employed in an amount of between 0 and about 75 weight percent based upon the total weight of the composition.

16. The method of claim 12 wherein said first polo as a molecular weight of between 2,000 and 10,000.

17. A "one-shot" process for producing a spandex fiber which comprises reacting a polyol, a diisocyanate, and a difunctional, isocyanato-reactive chain-extender, the polyol being prepared utilizing a double metal cyanide complex catalyst and having a molecular weight in the range of between about 1,500 and about 15,000 and a low level of terminal ethylenic unsaturation that is less than 0.03 milliequivalents per gram of polyol.

18. The process of claim 17 wherein said chain extender is selected from the group consisting of diols, diamines, hydrazine, and combinations thereof.

19. The process of claim 17 wherein said chain extender is selected from the group consisting of ethylene glycol, diethylene glycol, propylene glycol, dipropylene glycol, butane diol, pentane diol 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof.

20. The process of claim 17 which additionally contains at least one compounding ingredient selected from the group consisting of anti-oxidants, plasticizers, uv stabilizers, adhesion promoters, fillers and pigments and employed in an amount of between 0 and about 75 weight percent based upon the total weight of the composition.

21. The process of claim 17 wherein said first polyol has a molecular weight of between 2,000 and 10,000.

* * * * *